UNITED STATES PATENT OFFICE.

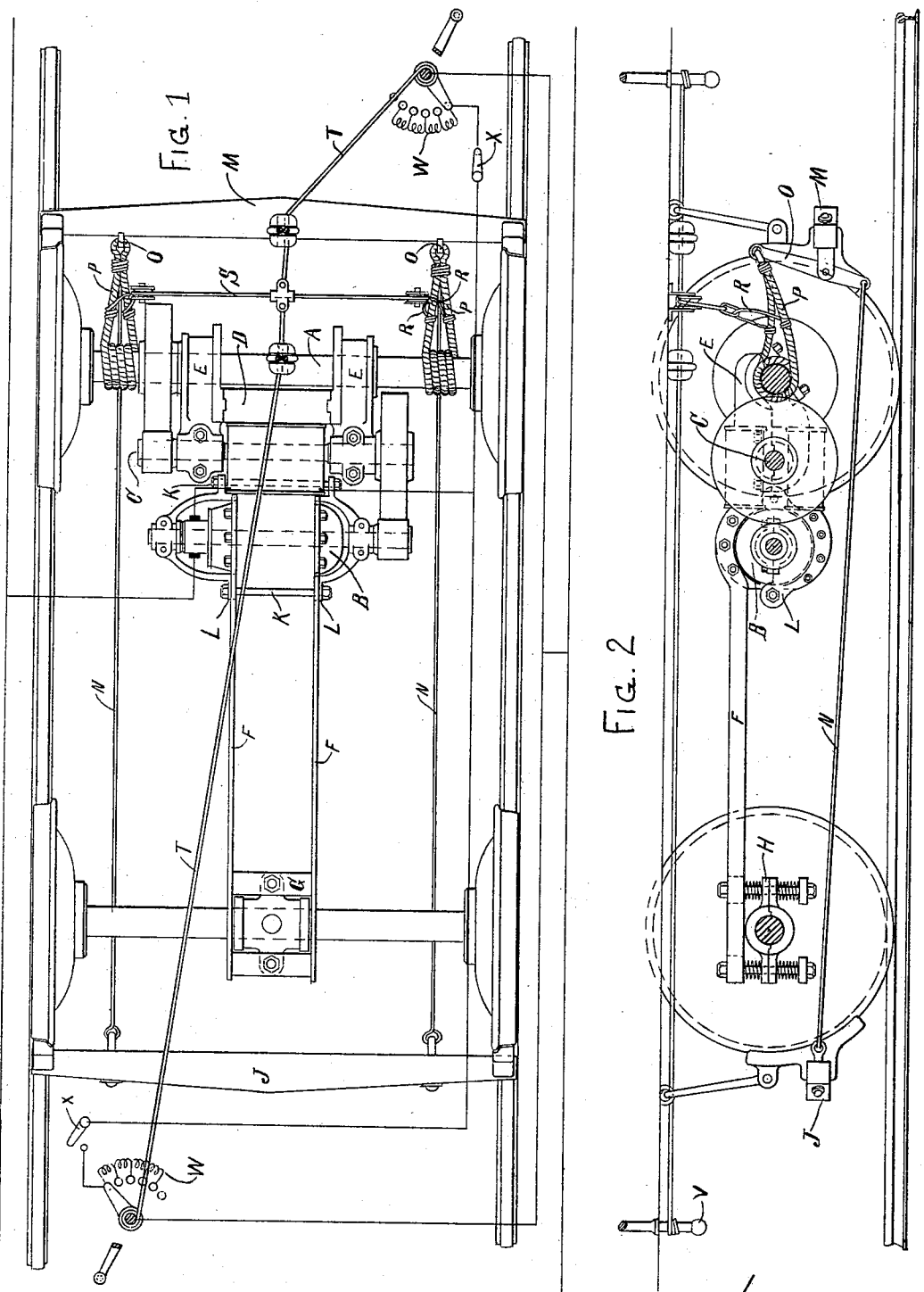

FRANCIS O. BLACKWELL, OF NEW YORK, N. Y., ASSIGNOR TO THE THOMSON-HOUSTON ELECTRIC COMPANY, OF CONNECTICUT.

BRAKE APPARATUS FOR ELECTRICALLY-PROPELLED CARS.

SPECIFICATION forming part of Letters Patent No. 508,673, dated November 14, 1893.

Application filed September 16, 1889. Serial No. 324,150. (No model.)

*To all whom it may concern:*

Be it known that I, FRANCIS O. BLACKWELL, a citizen of the United States, residing at New York, in the county of New York and State of New York, have invented certain new and useful Improvements in Brake Apparatus for Electrically-Propelled Vehicles, of which the following is a specification.

My invention relates to electric motor trucks and has special reference to the braking apparatus, though involving at the same time other important features in the construction of the motor.

Referring to the accompanying drawings, Figure 1 is a plan and Fig. 2 is an elevation partly in section of a truck embodying my devices.

"A" represents the axle of the truck upon which the motor is journaled. The motor has its field magnets horizontal with the yoke adjacent to the axle, and the armature "B" supported by a casting from the lower pole-piece. In this is a counter-shaft supported in bearings attached to the yoke "D," the yoke being also provided with rearward extensions "E" forming bearings for the axle. The free end of the motor is upheld by means of two bars "F" which are bolted to the upper pole-piece and carried over to the opposite axle. There they are provided with two cross-pieces "G" and have a spring connection with a box "H" on the axle. The castings which uphold the armature are bolted to the lower pole-piece and at the same time are connected by bolts "K" extending across from one to the other and attached to lugs "L" thereon. By this construction it is at all times easy to remove the lower pole-piece and the armature from beneath, the main body of the motor being supported from above. I do not, however, claim herein the specific manner of hanging the motor described and illustrated, as these features have been made the subject of a separate application, filed May 1, 1891, Serial No. 391,210, Patent No. 468,492, dated February 9, 1892.

For actuating the brake I provide two ropes which are first attached either to the brake-beam or a lever acting upon the brake-beam, and then given several turns around the axle and led back to the point of attachment, and I then provide means for taking up the slack from one end or the other of the rope, according to the direction of rotation of the axle. This causes the rope to bind tightly upon the axle and wind up therewith, drawing the brake-beam up against the wheel with great force. This construction is illustrated in the accompanying drawings, where "J" and "M" are the two brake-beams. Rods "N" are attached directly to the brake-beam "J" and led across to the opposite brake-beam where they are attached to one end of a short lever "O." To the other end of each of the two levers "O" is attached a rope "P" which takes several turns around the axle and then comes back to the point of attachment.

A device is provided for taking up the slack in one end of the rope "P" from either extremity of the car. This consists of a short loop "R" provided with connecting cords, or wires, "S" and "T" leading to opposite ends of the vehicle and there wound upon a spindle after the manner of the ordinary brake. As shown, T is led off to the spindles and is attached to S at the center of the latter. It will be understood, however, that the application of the brake in this form does not entail any exertion on the part of the operator; it is only necessary to exert a slight pull to take up the slack in the rope "P" when the turns of the rope around the axle will grip the axle tightly and wind the rope up on it, thereby drawing the brake-beams "J" and "M" with their attached shoes, forcibly against the wheel.

In the illustrations which I have given, the rope is wound upon the axle sustaining the motor and having the greatest weight, and at the same time the pressure is exerted upon all four wheels. Any other mechanical arrangement by which the rope may be wound upon the axle in whichever direction the axle may be rotating, may be employed in lieu of the forms shown herein, it being essential in all cases that the winding up of the rope shall draw the brake-beam tightly against the wheel and that this shall take place in whichever direction the axle may be turning.

It has been heretofore proposed to operate a controlling resistance for the motor and the brake by means of the same hand operated spindle. It has been found equally difficult, if not impracticable to do this on account of the great range of movement which the operation of the brake entails. The definite and short range of action which the resistance requires, is inconsistent with the indefinite range required by the brake with the great force which it is necessary to exert upon it; and this difficulty becomes further complicated when it is necessary that the brake and the resistance or other controlling device for the motor, be operated from both ends of the car by co-operating mechanism. I have found that, by employing a power brake, for example, that shown herein—it is only necessary to move the operating handle of the brake a short distance and with a light pressure. It thereby becomes possible to operate a brake of this character by the same handle used to control the motor.

In the drawings I have shown a spindle "V" at each end of the car, upon which is wound the cord, or wire "T" used for putting the power-brake into operation. By this same spindle "V" I operate the controlling device for the motor, which, in this case is shown to be the resistance "W." The devices are so connected that at starting the vehicle, the wire "T" controlling the brakes, is first slackened and the brakes released; a further movement then operates resistance "W." For stopping the vehicle these steps are taken in a reverse order.

It will be observed that there is no difference in the adjustment of the operating cords, for the brake in every position is not dependent upon the wear of the brake shoes. It will be also possible to employ a brake of any other character in connection with the controlling device, provided such brake is a power-brake, and the operator simply has control over the power and does not himself exert the pressure required to stop the car. I provide in addition to the regulating resistance "W," a circuit-breaking switch "X" so that, while the regular controlling device for the motor is attached to the brake, there will still be the circuit-breaking switch "X" for use in controlling the motor, should there be any occasion for it, due to the intimate connection between the brake and the resistance.

What I claim as new, and desire to secure by Letters Patent, is—

1. The combination with a vehicle, of a brake shoe, and an operating device for said brake shoe consisting of a rope attached thereto and wound loosely on the axle of the vehicle and devices for tightening said rope on the axle irrespective of its direction of rotation, whereby each direction of progress of the vehicle, the tightening of the rope on the axle will operate said brake shoe, substantially as described.

2. The combination with a brake-shoe, of operating devices therefor consisting of two ropes leading therefrom and having intermediate turns around the axle, with means for taking up the slack and actuating one or the other of said ropes by the axle, according to the direction of rotation.

3. The combination with one or more brake-shoes acting upon different wheels of a vehicle, of a common actuating device for the said brake-shoes consisting of a rope or similar device wound around the axle of the vehicle and provided with means for taking up the slack and causing the same to tighten on the axle and thereby apply the brake shoes.

4. The combination with an axle of a vehicle, of a rope wound around the same, the opposite extremities of the winding being both connected to a brake-shoe, with means for tightening the rope and causing it to be wound upon the axle in either direction of rotation.

5. The combination with a brake-shoe, of an operating lever and an actuating device attached to the long end of said lever, consisting of a rope or similar device, having several loose turns about the axle of the vehicle and provided with devices for tightening said turns upon the axle.

6. The combination with a power-driven axle of a vehicle, of a motor having bearings in the central part of the axle, and one or more brake-actuating ropes or similar devices, wound around the axle outside of the motor bearing.

7. The combination with a brake-shoe of a vehicle, of an operating device therefor consisting of a rope or similar device wound around the axle of the vehicle, with a controlling tightener extending to opposite ends of the vehicle.

8. The combination with one or more brake-shoes of a vehicle, of two controlling ropes around the axle and a common controlling device therefor.

9. The combination with an electrically propelled vehicle, of a power-brake, and a common controlling device for said brake and the motor.

10. The combination with an electrically propelled vehicle, of a power-brake and a common controlling device for the brake and motor, acting successively thereon.

11. In an electrically propelled vehicle, the combination with a propelling motor of a power-driven brake, a regulating resistance for the motor and a common controlling device for the resistance and the brake, acting successively thereon.

12. In an electrically propelled vehicle, the combination with a propelling motor, of a power driven brake, a common controlling device for the motor and the brake, and a supplementary independent circuit breaker in the motor circuit, substantially as set forth.

13. The combination in an electrically propelled vehicle, of a brake actuated by the power of the vehicle, and a common controlling device for said brake and the motor.

Signed and witnessed this 20th day of August, 1889.

FRANCIS O. BLACKWELL.

Witnesses:
GEORGE BAUMANN,
HUBERT HOWSON.